United States Patent
Leonard

(10) Patent No.: US 10,656,298 B2
(45) Date of Patent: May 19, 2020

(54) ULTRASONIC BEAM FOCUS ADJUSTMENT FOR SINGLE-TRANSDUCER ULTRASONIC ASSEMBLY TOOLS

(71) Applicant: BAKER HUGHES INCORPORATED, Houston, TX (US)

(72) Inventor: Zachary Leonard, Magnolia, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 15/207,036

(22) Filed: Jul. 11, 2016

(65) Prior Publication Data

US 2018/0011211 A1    Jan. 11, 2018

(51) Int. Cl.
*G01V 1/52* (2006.01)
*G01N 29/06* (2006.01)
(Continued)

(52) U.S. Cl.
CPC .............. *G01V 1/52* (2013.01); *G01M 5/0025* (2013.01); *G01N 23/18* (2013.01); *G01N 25/72* (2013.01);
(Continued)

(58) Field of Classification Search
CPC ..... G01N 2291/044; G01N 2291/0289; G01N 29/262; G01N 2291/2634;
(Continued)

(56) References Cited

U.S. PATENT DOCUMENTS 3,927,557 A   12/1975   Viertl
5,240,005 A    8/1993   Viebach
(Continued)

FOREIGN PATENT DOCUMENTS

DE     3739393 A1    6/1989
DE    19710668 A1    9/1998
WO   2014099122 A1   6/2014

OTHER PUBLICATIONS

PCT Application No. PCT/US17/040925 International Search Report dated Sep. 28, 2017.

*Primary Examiner* — Daniel S Larkin
*Assistant Examiner* — Anthony W Megna Fuentes
(74) *Attorney, Agent, or Firm* — Mossman Kumar & Tyler PC

(57) ABSTRACT

Methods, systems, devices, and products for ultrasonic borehole logging using an ultrasonic borehole imaging tool in a borehole intersecting the earth formation. Methods may include adjusting a focus for an ultrasonic beam generated from a single-transducer ultrasonic assembly of the ultrasonic imaging tool; using a receiver to generate measurement information responsive to an ultrasonic signal caused by the ultrasonic beam; and estimating a parameter of interest from the measurement information. Methods may include adjusting the focus in dependence upon environmental conditions, the environmental conditions comprising at least one of: i) standoff between the ultrasonic imaging tool and a wall of the borehole; and ii) borehole annulus conditions. Methods may include adjusting the focus in substantially real-time. The ultrasonic beam may be focused with a focal zone at the borehole wall configured to produce a beam spot size of a selected diameter.

9 Claims, 12 Drawing Sheets

(51) Int. Cl.
*G01M 5/00* (2006.01)
*G01N 23/18* (2018.01)
*G01N 25/72* (2006.01)
*G01N 29/22* (2006.01)
*G01N 29/24* (2006.01)
*G01N 29/26* (2006.01)
*G01N 29/00* (2006.01)
*G10K 11/26* (2006.01)
*G10K 11/22* (2006.01)
*G10K 11/30* (2006.01)
*G01V 1/44* (2006.01)
*G01V 1/46* (2006.01)

(52) U.S. Cl.
CPC ......... *G01N 29/00* (2013.01); *G01N 29/0645* (2013.01); *G01N 29/0654* (2013.01); *G01N 29/221* (2013.01); *G01N 29/2456* (2013.01); *G01N 29/2462* (2013.01); *G01N 29/262* (2013.01); *G01V 1/44* (2013.01); *G10K 11/22* (2013.01); *G10K 11/26* (2013.01); *G10K 11/30* (2013.01); *G01N 2291/0289* (2013.01); *G01N 2291/044* (2013.01); *G01N 2291/101* (2013.01); *G01N 2291/2634* (2013.01); *G01V 2001/526* (2013.01)

(58) Field of Classification Search
CPC ......... G01N 2291/101; G01N 29/0654; G01N 29/221; G01N 29/0645; G01N 29/00; G01N 23/18; G01N 25/72; G01N 29/2456; G01N 29/2462; G10K 11/22; G10K 11/26; G10K 11/30
USPC ........ 73/152.01–152.62, 620, 622–624, 627, 73/629, 640, 642, 644
See application file for complete search history.

(56) References Cited

U.S. PATENT DOCUMENTS

| | | | |
|---|---|---|---|
| 5,419,335 | A | 5/1995 | Hartmann et al. |
| 6,418,792 | B1 | 7/2002 | Spychalski |
| 7,806,839 | B2 | 10/2010 | Mast et al. |
| 7,957,219 | B2 | 6/2011 | Hall et al. |
| 8,422,338 | B2 | 4/2013 | Kuiper et al. |
| 9,110,166 | B2 | 8/2015 | Chang et al. |
| 2008/0194967 | A1* | 8/2008 | Sliwa ................ A61N 7/02 600/472 |
| 2008/0264716 | A1 | 10/2008 | Kuiper et al. |
| 2009/0133871 | A1 | 5/2009 | Skinner et al. |
| 2011/0080804 | A1 | 4/2011 | Vu et al. |
| 2011/0319768 | A1* | 12/2011 | Saito ................ A61B 8/4281 600/472 |
| 2013/0142009 | A1 | 6/2013 | Chang et al. |
| 2013/0286309 | A1 | 10/2013 | Valley et al. |
| 2014/0177388 | A1* | 6/2014 | D'Angelo .......... E21B 47/0002 367/35 |
| 2016/0177710 | A1* | 6/2016 | Le Calvez .......... E21B 49/00 367/7 |

\* cited by examiner

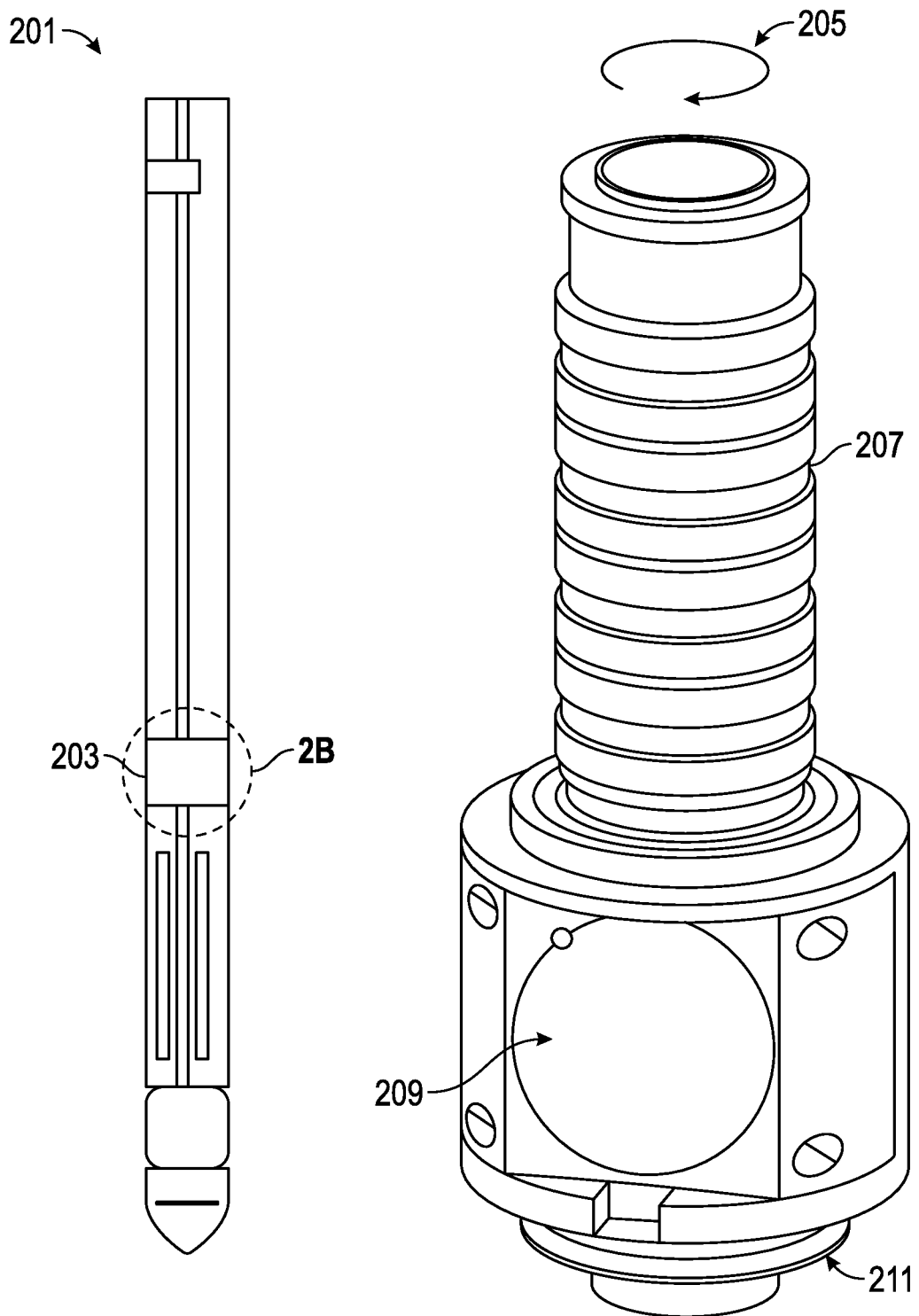
FIG. 2A  FIG. 2B

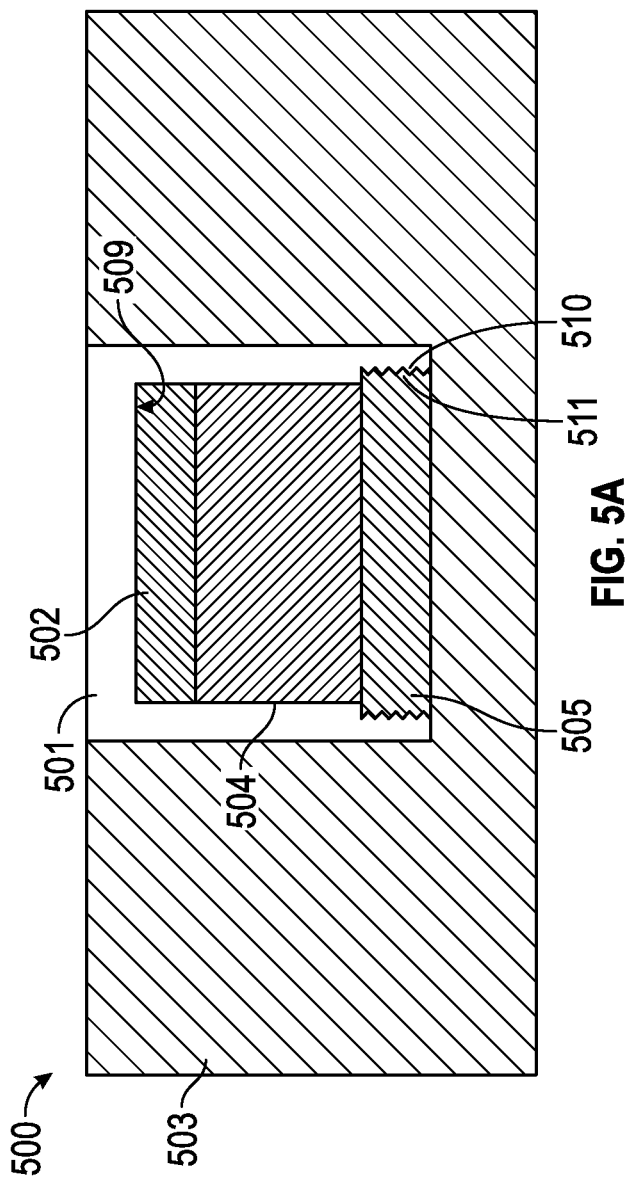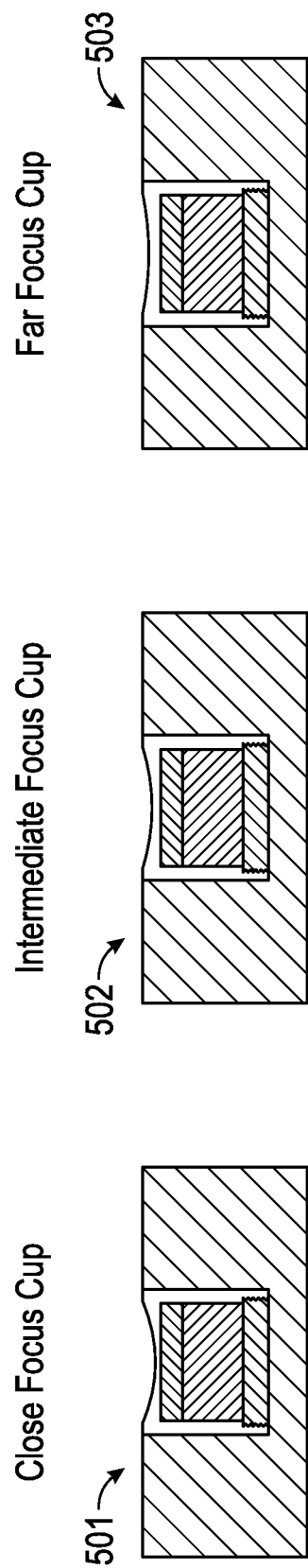

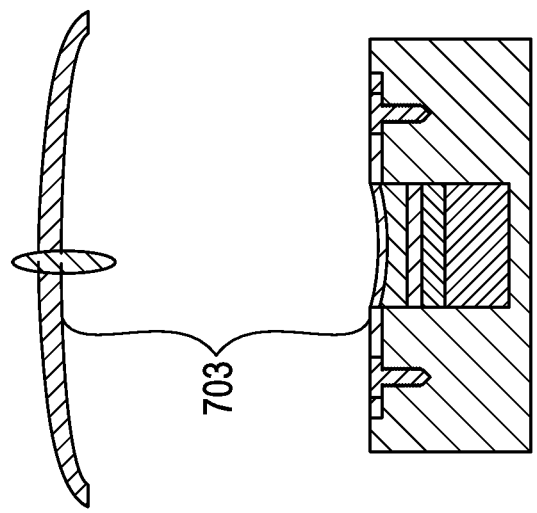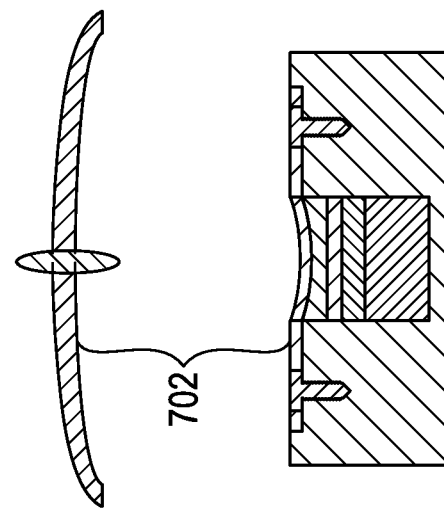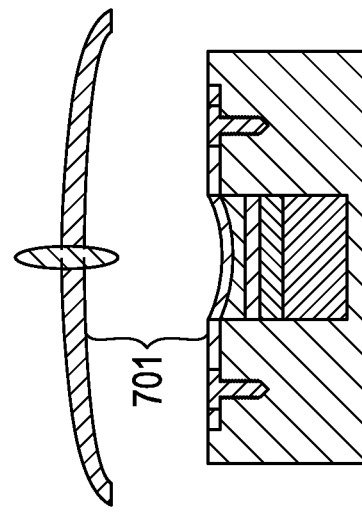
FIG. 7

ULTRASONIC BEAM FOCUS ADJUSTMENT FOR SINGLE-TRANSDUCER ULTRASONIC ASSEMBLY TOOLS

FIELD OF THE DISCLOSURE

This disclosure generally relates to borehole tools, and in particular to methods and apparatuses for conducting ultrasonic downhole measurements.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations.

Typical acoustic logging tools may include, by way of example, a televiewer which comprises a rotating ultrasonic acoustic transducer that operates in a frequency range on the order of 100 kHz or more. Higher acoustic frequencies are preferred in order to achieve better resolution in the confined space of a borehole. In operation, the televiewer may rotate at a desired rate, such as 5 to 16 rotations per second, for example, to continuously scan the borehole sidewall as the televiewer is drawn up the borehole at a rate which may be around 3/16 inches to 3/8 inches per scan. A beam of acoustic pulses is launched along the normal to the borehole sidewall as the transducer scans the interior surface of the borehole. The pulse rate depends upon the desired spatial resolution such as 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include determination of the goodness of a cement bond to a steel casing as well as monitoring the integrity of the casing itself.

The diameter of a borehole logger may be on the order of 2⅞ in (7.3 cm), so that it can be run into relatively small boreholes. However, many borehole diameters are on the order of 10-14" (25.4-35.6 cm) or more, so that the length of the acoustic-pulse trajectory from the transducer, through the borehole fluid to the borehole sidewall, may be up to 10" (25.4 cm). In the normal course of events, the borehole fluid may be contaminated by drill cuttings, air bubbles and foreign matter which severely attenuate the acoustic energy by scattering because the physical dimensions of the contaminants are comparable to the wavelength of the wavefields emitted by the transducer.

SUMMARY OF THE DISCLOSURE

In aspects, the present disclosure is related to methods and apparatus for estimating downhole parameters relating to an earth formation intersected by a borehole, such as, for example, borehole geometry, bed boundary distance and orientation, fracture distance, orientation, and extent, dip, and so on.

Method aspects may include ultrasonic borehole logging using an ultrasonic borehole imaging tool in a borehole intersecting the earth formation. Methods may include adjusting a focus for an ultrasonic beam generated from a single-transducer ultrasonic assembly of the ultrasonic imaging tool; using a receiver to generate measurement information responsive to an ultrasonic signal caused by the ultrasonic beam; and estimating a parameter of interest from the measurement information. Methods may include adjusting the focus in dependence upon environmental conditions, the environmental conditions comprising at least one of: i) standoff between the ultrasonic imaging tool and a wall of the borehole; and ii) borehole annulus conditions. Methods may include adjusting the focus in substantially real-time. The ultrasonic beam may be focused with a focal zone at the borehole wall configured to produce a beam spot size of a selected diameter.

Adjusting the focus may include selecting a lens having at least one focal parameter corresponding to the environmental conditions from a set of interchangeable ultrasonic lenses, wherein each lens of the set has focal parameters unique within the set corresponding to particular environmental conditions; coupling the lens with a transducer of the ultrasonic imaging tool; and generating the ultrasonic beam using the lens. Methods may include, upon a change in environmental conditions: removing the lens; selecting a second lens from the set; coupling the second lens with the transducer; and generating the measurement information with the second lens. Methods may include, upon a change in a state of operation of the lens: removing the lens; selecting a replacement lens; coupling the replacement lens with the transducer; and generating the measurement information with the replacement lens.

Adjusting the focus may include identifying at least one focal parameter corresponding to the environmental conditions; adjusting a variable focus lens assembly comprising a lens to modify a focal parameter of a lens responsive to the identified at least one focal parameter; and generating the ultrasonic beam using the lens after the adjusting. Modifying the at least one focal parameter may include altering the curvature of the lens.

The lens assembly may include the lens and a transducer assembly. Modifying the at least one focal parameter may include changing an amount of at least one fluid between the lens and the transducer assembly to alter the curvature of the lens. Changing the amount of the at least one fluid may result in a lower pressure between the lens and the transducer assembly than an exterior of the lens assembly.

Embodiments include apparatus for ultrasonic borehole logging in a borehole intersecting the earth formation. Apparatus may include an ultrasonic borehole imaging tool comprising: a single-transducer ultrasonic assembly comprising an adjustable focus lens assembly; a receiver configured to generate measurement information responsive to an ultrasonic signal caused by the ultrasonic beam; and at least one processor configured to estimate a parameter of interest from the measurement information. The adjustable focus lens assembly may include a variable focus lens assembly comprising a lens to modify a focal parameter of the ultrasonic beam. The at least one processor may be configured to: identify at least one focal parameter corresponding to environmental conditions; and adjust the variable focus lens assembly to modify the focal parameter responsive to the identified at least one focal parameter.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 2A shows mandrel section of an imager instrument in accordance with embodiments of the disclosure.

FIG. 2B shows a rotating platform with the ultrasonic transducer assembly disposed thereon in accordance with embodiments of the disclosure.

FIG. 5A illustrates an alternative interchangeable lens ultrasonic imaging system in accordance with embodiments of the present disclosure.

FIGS. 5B-5D illustrate an adjustable-focus lens assembly ultrasonic imaging system with interchangeable lenses that fit within a removable transducer cup in accordance with embodiments of the present disclosure.

FIG. 7 illustrates three focus options that produce a small beam spot diameter at the required standoff of the borehole wall.

DETAILED DESCRIPTION

Figure 1A:
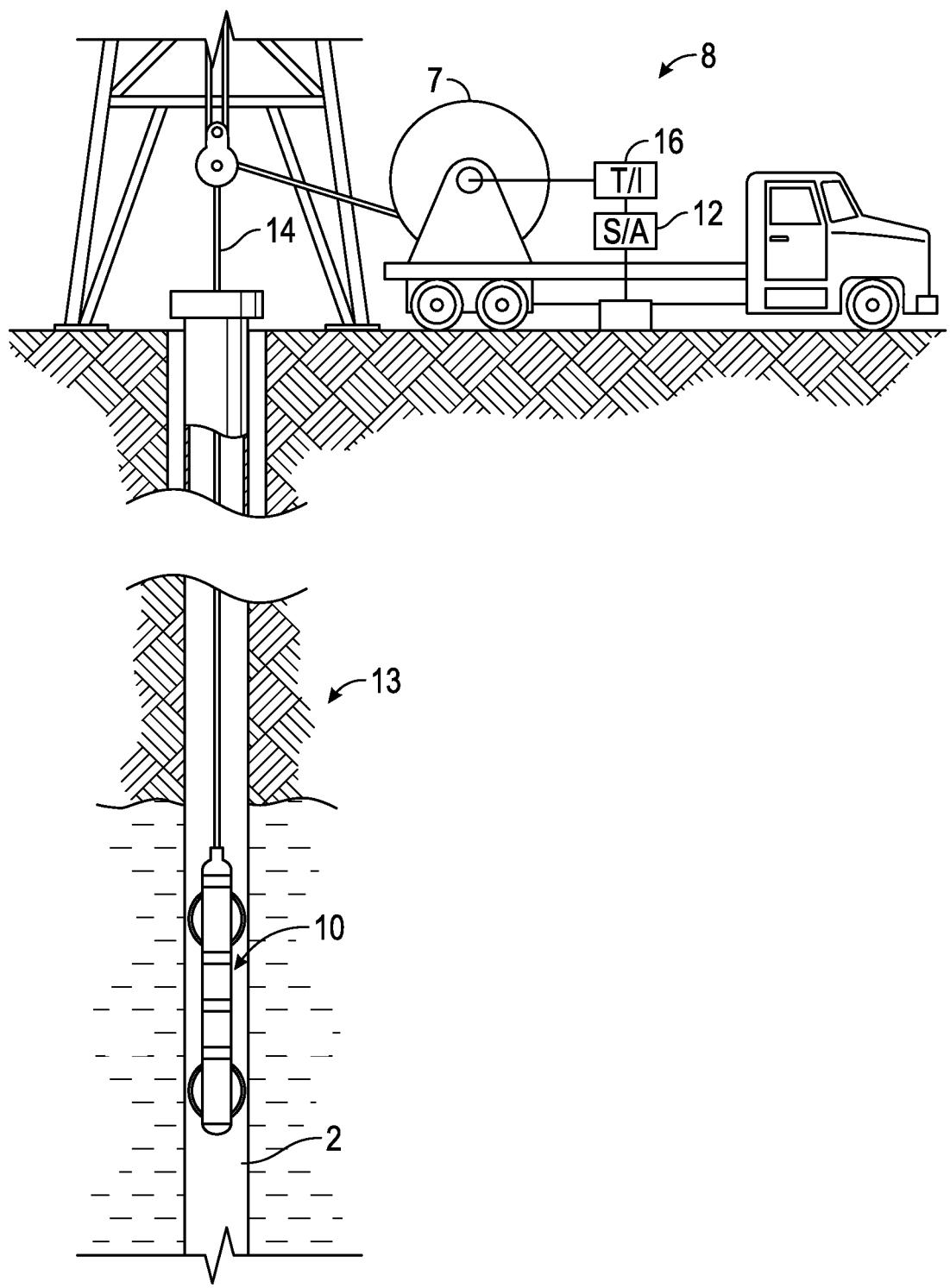
FIG. 1A shows an ultrasonic well logging instrument being lowered into a wellbore.

Aspects of the present disclosure relate to apparatus and methods for ultrasonic well logging, including measurement and interpretation of physical phenomena indicative of parameters of interest of the formation, the borehole, or casing therein. These parameter values may be used to evaluate and model the borehole (or formation), and for conducting further operations in the formation or the borehole.

Aspects of the present disclosure relate to modeling a volume of an earth formation, an interior surface of the borehole, or a geometry of the borehole. The model of the earth formation generated and maintained in aspects of the disclosure may be implemented as a representation of physical properties stored as information. The information (e.g., data) may be stored on a non-transitory machine-readable medium, transmitted, and rendered (e.g., visually depicted) on a display.

High resolution borehole imaging using ultrasonic signals provides greater resolution at a reduced cost and improved reliability. However, current "unfocused" transducers cannot detect fractures below approximately 1-2 mm in width, and detection of smaller features in the formation would be desirable. Unfortunately, however, configuration of the lens to a particular set of focal parameters to optimize the information obtained, such as, for example, optimizing resolution, is highly dependent upon a particular borehole environment. For example, borehole standoff may vary widely from one well to another (and sometimes intrawell).

Recently, transducer arrays featuring constructive interference have been attempted as a solution to these issues, but implementation of high resolution with such arrays has proven challenging. Such arrays may also increase complexity of the tool, and thus lower reliability and increase cost. A single transducer (e.g., single-beam) ultrasonic imager adaptable to various borehole conditions would therefore be highly desirable.

Aspects of the present disclosure relate to methods of ultrasonic borehole logging including adjusting a focus for an ultrasonic beam generated from a single-transducer ultrasonic assembly of an ultrasonic imaging tool, which may be carried out via an adjustable-focus lens assembly. Smaller formation features can be detected by the adjustable-focus lens assembly sensor than with current imaging transducers.

Aspects of the present disclosure include the use of a set of interchangeable ultrasonic lenses, which allow customizable beam focusing in multiple borehole sizes with a single piezoelectric transducer. By using an interchangeable lens in front of a common transducer, a high resolution ultrasonic borehole image can be generated in a wide range of borehole sizes without the need for multiple transducers with different focal zones. The lens's geometry can be designed to focus the ultrasonic signal to a limited aperture beam spot diameter that has the proper near-far-field transition for the standoff from the borehole wall. This acoustic lens may be attached to the tool at the surface based on the borehole size for the well to be evaluated. A highly focused beam field may produce a high-resolution image of borehole features that could be logged, stored, transmitted, or displayed in real time. Aspects of the disclosure allow high-resolution imaging using a single transducer in a wide range of borehole sizes with increased sensor reliability. Aspects of the present disclosure further include the use of a variable-focus lens assembly which allows for the use of a single transducer for imaging a borehole responsive to varying environmental conditions (e.g., standoff) in a single run. In some general embodiments, overall reliability of the sensor is increased and costs decreased, because it is cheaper and faster to replace a lens suffering wear or damage than an entire piezoelectric transducer assembly.

In aspects, this disclosure relates to making a downhole measurement. Downhole measurement, as used herein, may be defined as a measurement taken in a borehole intersecting an earth formation indicative of a parameter of interest of the borehole, the formation, or a infrastructure (e.g., casing, cement, etc.) therein, i.e., a parameter of interest. Techniques described herein are particularly suited to measurement of values of properties of the borehole through the use of instruments utilizing single-source ultrasonic beam investigation as described above. These values may be used to evaluate and model the formation or the borehole, and for conducting further operations in the formation or the borehole.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Referring to FIG. 1A, an ultrasonic well logging instrument 10 is shown being lowered into a wellbore 2 penetrating earth formations 13. The instrument 10 may be lowered into the wellbore 2 and withdrawn therefrom by a carrier 14 (e.g., an armored electrical cable). In one embodiment, circuitry associated with the instrument 10 (described in further detail below with respect to FIG. 2) may be configured to take measurements using an ultrasonic transducer at a plurality of azimuthal orientations (e.g., while the transducer platform is rotating as the tool moves along the longitudinal axis of the borehole ('axially'). These measurements may be substantially continuous, which may be defined as being repeated at very small increments of depth and azimuth, such that the resulting information has sufficient scope and resolution to provide an image of borehole parameters (e.g., properties of the formation at the borehole).

The cable 14 can be spooled by a winch 7 or similar device known in the art. The cable 14 may be electrically connected to a surface recording system 8 of a type known in the art which can include a signal decoding and interpretation unit 16 and a recording unit 12. Signals transmitted by the logging instrument 10 along the cable 14 can be decoded, interpreted, recorded and processed by the respective units in the surface system 8.

Systems in accordance with the present disclosure may alternatively include a conventional derrick and a conveyance device, which may be rigid or non-rigid, which may be configured to convey the downhole tool 10 in the wellbore. Drilling fluid ('mud') may be present in the borehole. The carrier may be a drill string, coiled tubing, a slickline, an e-line, a wireline, etc. Downhole tool 10 may be coupled or combined with additional tools, including, e.g., some or all the information processing system of FIG. 11. Thus, depending on the configuration, the tool 10 may be used during drilling and/or after the wellbore has been formed. While a land system is shown, the teachings of the present disclosure may also be utilized in offshore or subsea applications. The carrier may include a bottom hole assembly, which may include a drilling motor for rotating a drill bit.

One point of novelty of the system illustrated in FIG. 1A is that the at least one processor may be configured to perform certain methods (discussed below) that are not in the prior art. A surface control system or downhole control system may be configured to control the tool described above and any incorporated sensors and to estimate a parameter of interest according to methods described herein.

Aspects of the present disclosure are subject to application in various different embodiments. In some general embodiments, the carrier is implemented as a tool string of a drilling system, and the acoustic wellbore logging may be characterized as "logging-while-drilling" (LWD) or "measurement-while-drilling" (MWD) operations.

Figure 1B:
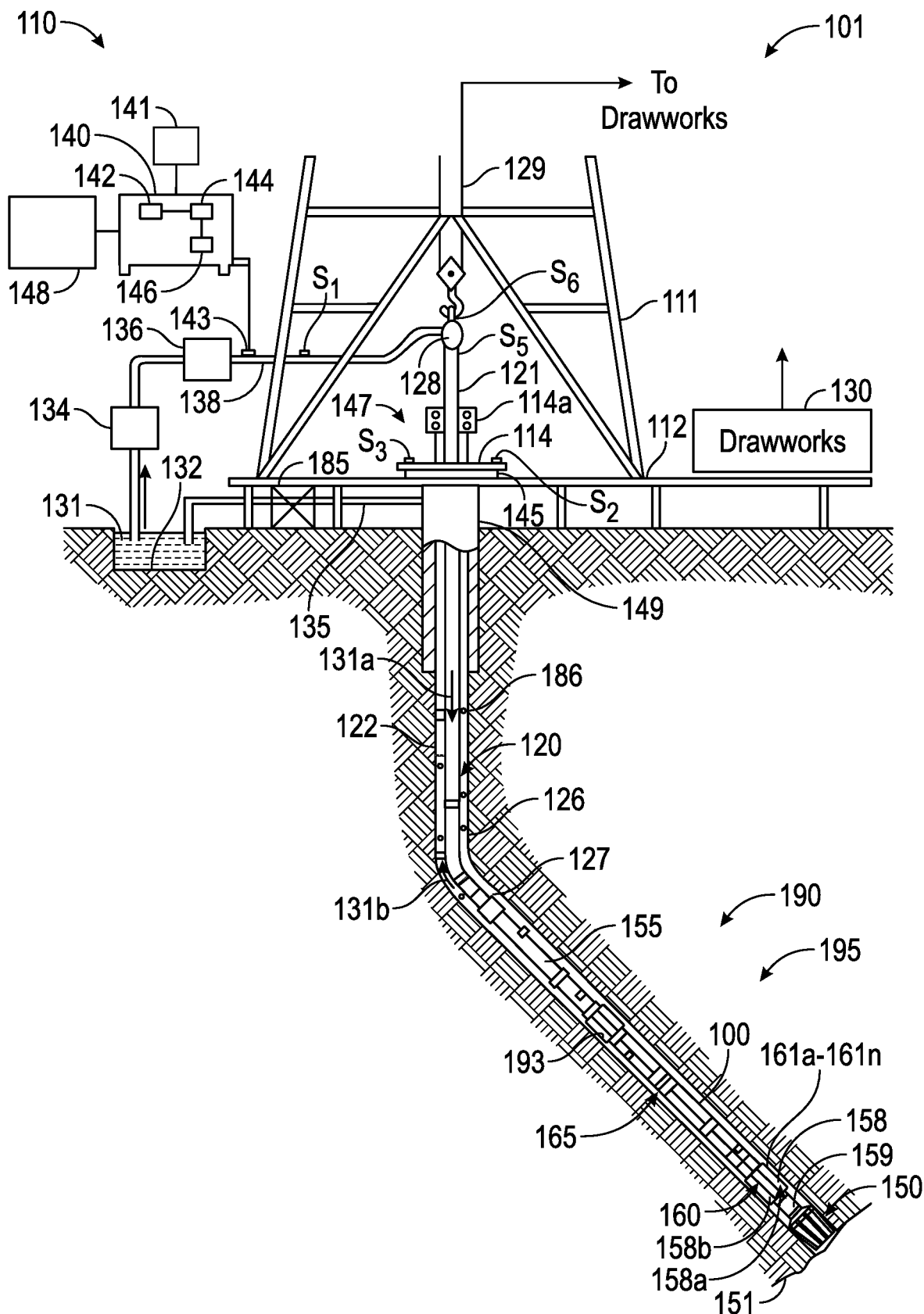
FIG. 1B is a schematic diagram of an exemplary drilling system in accordance with embodiments of the disclosure.

FIG. 1B is a schematic diagram of an exemplary drilling system 101 according to one embodiment of the disclosure. FIG. 1B shows a drill string 120 that includes a bottomhole assembly (BHA) 190 conveyed in a borehole 126. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to the ultrasonic transducer described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. While a drill string 120 is shown as a conveyance device for sensors 165, it should be understood that embodiments of the present disclosure may be used in connection with tools conveyed via rigid (e.g. jointed tubular or coiled tubing) as well as non-rigid (e.g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIG. 1B is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an ultrasonic beam, from each of a plurality of azimuthally distributed orientations about a BHA. In some general embodiments, surface processor 142, downhole processor 193, or other processors (e.g. remote processors) may be configured to operate the tool 101 to excite and measure ultrasonic signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

FIG. 2A shows mandrel section 201 of the imager instrument. Shown in FIG. 2B is a rotating platform 205 with the ultrasonic transducer assembly 209 disposed thereon. This may be referred to as a rotatable transducer assembly. The rotating platform may also be provided with a magnetometer 211 to make measurements of the orientation of the platform and the ultrasonic transducer. The platform may be provided with coils 207 that are the secondary coils of a transformer that are used for communicating signals from the transducer and the magnetometer to the non-rotating part of the tool. The ultrasonic transducer assembly 209 is discussed further below.

Figure 3A:
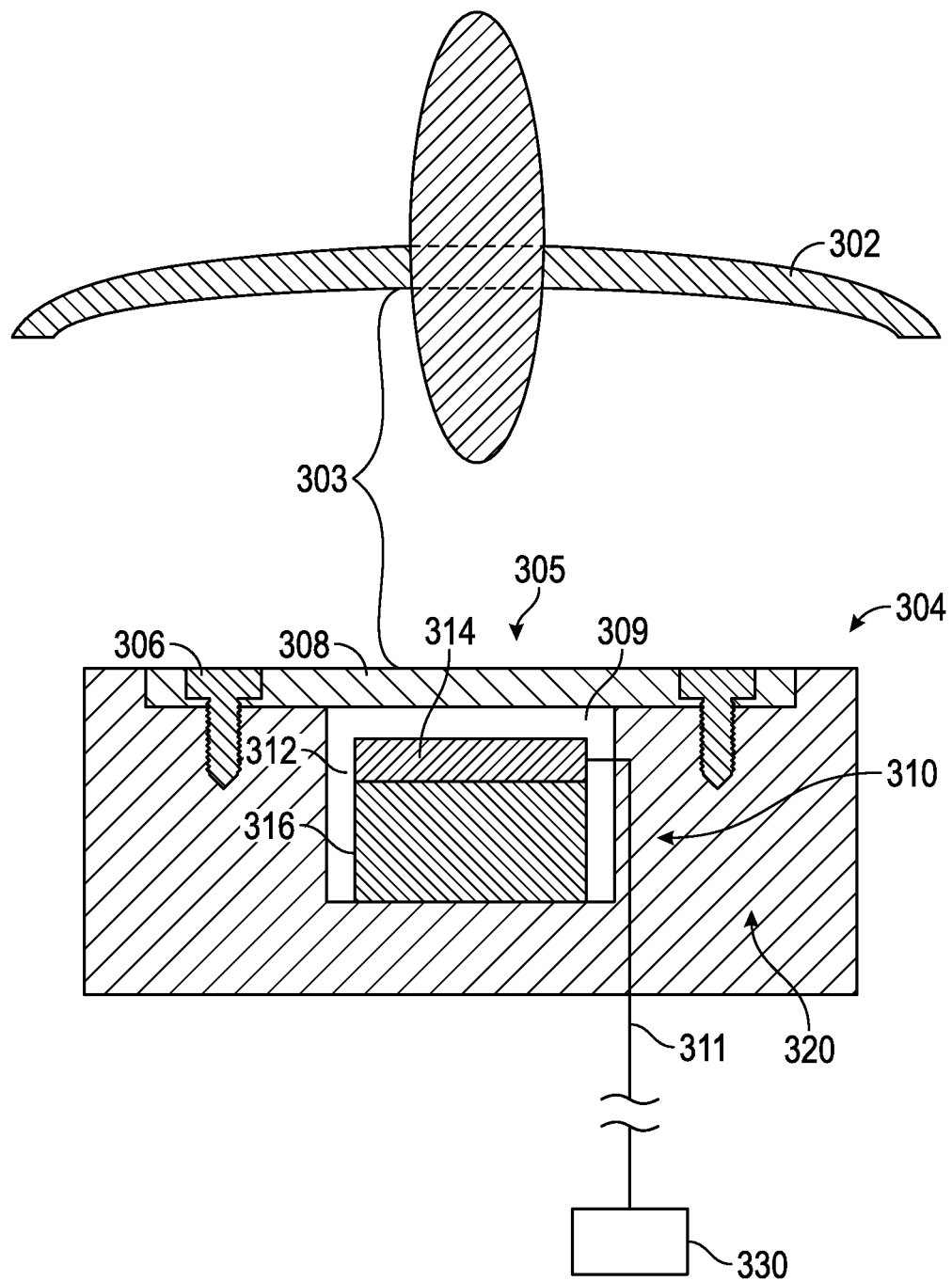
FIGS. 3A-3D show a transducer assembly with an unfocused lens in the borehole in accordance with embodiments of the present disclosure.

FIGS. 3A-3D show a transducer assembly with an unfocused lens in the borehole in accordance with embodiments of the present disclosure. FIG. 3A shows a schematic illustration of a cross section of a transducer assembly with an unfocused lens in the borehole at intermediate standoff. The ultrasonic borehole imaging tool 304 is located in the borehole at a borehole depth and at a standoff 303 from the borehole wall 302. A lens assembly 305 of the ultrasonic imaging tool 304 is installed on the tool body.

The adjustable-focus lens assembly 305 may be installed into the tool body 320 with bolts 306 or similar fasteners. The bolts 306 are torqued to a standard value to create a consistent contact force between the lens 308 and the transducer 310. The contact force may acoustically couple the lens 308 and the transducer cup 312. A couplant 309 (e.g., silicon oil) may be placed between the lens 308 and the transducer cup 312 to minimize loss in the transmission of signal between the two layers. The cup 312, lens 308, and an optional matching layer may have similar acoustic impedance to reduce transmission loss.

The transducer 310 further includes piezoelectric element 314 within the cup 312 and backing material 316. In embodiments, the backing material 316 may be a 0-3 composite of tungsten particles in high temperature rubber. Alternatively, liquid Viton®, a synthetic rubber, may be used. The backing material 316 absorbs acoustic signals propagating from the transducer away from the borehole wall and reduces reflections from the interface between the transducer and the backing material. Also shown in FIG. 3 are the leads 311 from the transducer that go to transformer coils 207 and on to circuitry 330.

In operation, the transducer 310 sends an ultrasonic signal through the lens 308. The borehole wall 302 produces an echo signal that returns to the rotatable transducer assembly 209. Lens assembly 305 or another acoustic receiver of the ultrasonic borehole imaging tool 304 is used to generate measurement information from an acoustic signal responsive to the ultrasonic beam, via electronics 330, which may include one or more processors. The tool may be a single-beam ultrasonic tool—that is, the tool may rely on a single ultrasonic beam at any given time.

An important factor in ultrasonic sensor performance is the size and location of the 6 dB focal zone of the sound field. The 6 dB focal zone is the "optimal zone" where the transducer generates the strongest signal. Placing the object of interest, e.g., the borehole wall, in the focal zone will produce the best detection of formation features, such as, for example, natural fractures. Thus, it may be highly desirable to ensure the standoff 303 from the tool outer diameter ('OD') to the borehole wall 302 fits within the 6 dB focal zone of the transducer. The second characteristic that determines the image resolution is the beam spot diameter, which is also known as the focal width or beam spot size. A beam spot size of lesser dimensions allows detection of smaller features in the formation, which in turn allows generation of a higher resolution image.

Figure 3D:
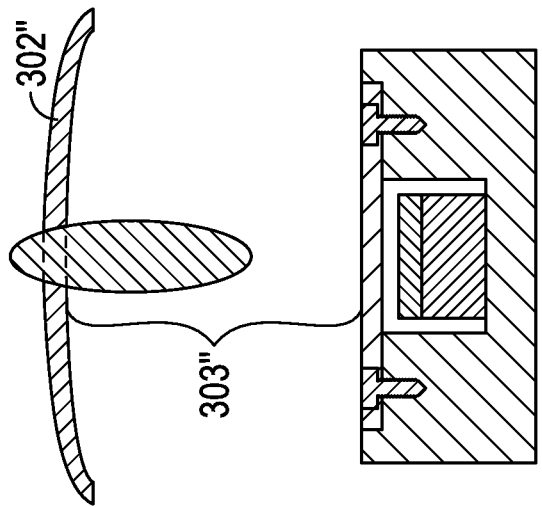
Figure 3C:
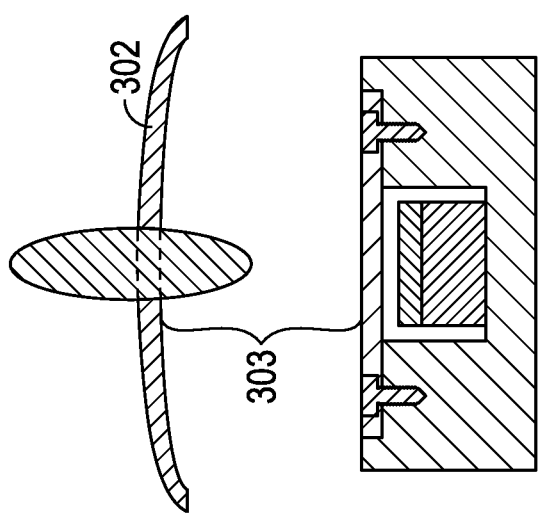
Figure 3B:
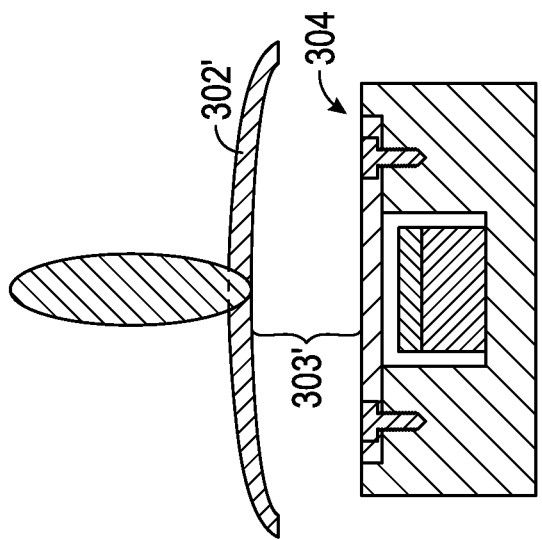

The flat-faced lens may be used to produce an unfocused signal. FIGS. 3B-3D show schematic illustrations of a transducer assembly with an unfocused lens in the borehole at varying standoffs 303', 303, 303", such as, for example, at various borehole depths. The benefits of an unfocused signal are a long focal zone that provides some allowance in borehole size. The unfocused lens could produce a sufficient (but not optimal) initial borehole image in a borehole with varying size, and could be useful in formations with significant washout.

While the unfocused lens would produce a borehole image, the image resolution could be increased from the unfocused embodiments by narrowing the beam spot diameter with a focused lens. Another benefit of a focused beam is that the signal is less sensitive to angle of incidence; small deviations in perpendicularity of the transducer axis to the borehole wall are allowable. Conventionally produced focused transducers prove to be quite sensitive to borehole size; a larger standoff would bring the object of interest out of focus and into the far field, producing an image of considerably lower quality.

The difficulty of machining the precise curvature into the piezoelectric disc and cup adds to the complexity and cost of this design. In contradistinction, flat-faced transducers are generally easier to manufacture and produce more consistent measurements from transducer to transducer, and lenses are much more easily fabricated separate from the transducer. In some applications, however, a curved-face transducer may be advantageous. For example, appropriate curved-faced transducers may be commercially available having characteristics suitable for a particular job.

Figures 4A, 4B, 4C:
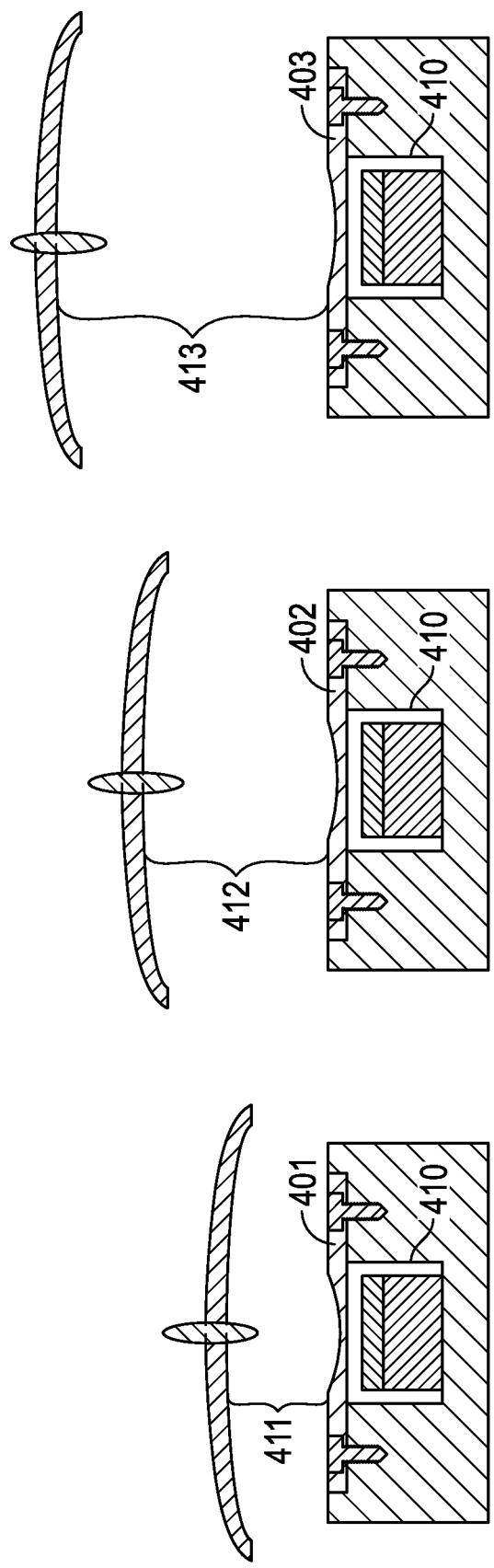
FIGS. 4A-4C illustrate an interchangeable lens ultrasonic imaging system in accordance with embodiments of the present disclosure.

FIGS. 4A-4C illustrate an interchangeable lens ultrasonic imaging system in accordance with embodiments of the present disclosure. A set of varying-focus acoustic lenses 401, 402, 403 are used in tandem with a transducer 410 (e.g., a flat-faced transducer) to ensure the borehole wall standoff 411, 412, 413 fits within the 6 dB focal zone of the transducer. As can be seen, the three focused lens options have different machined geometries (e.g., curvatures) to produce a small beam spot diameter at the required standoff of the borehole wall. Each lens is machined with a concave, spherical feature over the transducer which is configured to adjust the location of the focal zone to a particular standoff. The spherical lens also narrows the focal width, providing a very strong signal in a localized region. Thus, an appropriately selected adjustable-focus acoustic lens assembly may be used to produce focal parameters configured to ensure the borehole wall standoff fits within the focal zone.

Another method of achieving a curved face to focus the transducer signal could be to incorporate the varying curvature set of lenses into the transducer cup prior to insertion of the cup into the tool body, and allow the piezoelectric disc and backing to be removable.

FIG. 5A illustrates an alternative interchangeable lens ultrasonic imaging system 500 in accordance with embodiments of the present disclosure. Backing material 504 is bonded to the piezoelectric element 502 but the coupling between the piezoelectric element 502 and transducer cup 501 is accomplished with a couplant (e.g., silicone oil). In some implementations, internal thread 510 is machined into the inner diameter ('ID') of the cup 501 to allow the application of external threads 511 of a threaded plug 505 to bias the elements, thereby creating a consistent contact between the piezoelectric element 502 and the front face 509 of the cup. The plug could be torqued to a consistent value to ensure consistent contact force.

FIGS. 5B-5D illustrate an adjustable-focus lens assembly ultrasonic imaging system with interchangeable lenses that fit within a removable transducer cup in accordance with embodiments of the present disclosure. FIGS. 5B-5D show interchangeable lenses could be machined with a concave surface of varying curvature to adjust the location of the focal zone and narrow the beam width. The ultrasonic imaging tool may alternatively comprise an interchangeable set of transducer cups having various ultrasonic lenses that allows configurable beam focusing in accordance with multiple borehole sizes.

Figure 6:
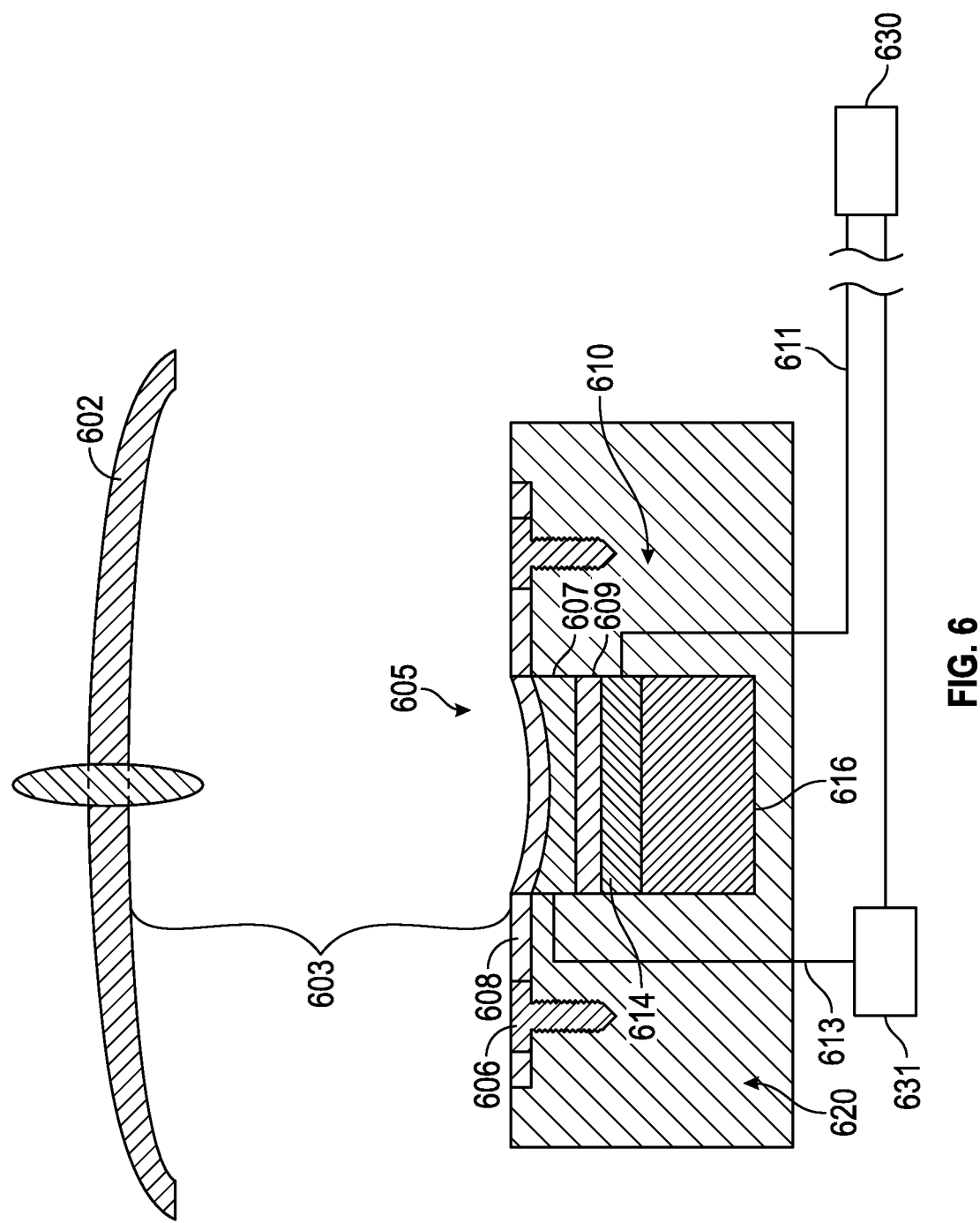
FIG. 6 illustrates a variable focus lens ultrasonic imaging system in accordance with embodiments of the present disclosure.

FIG. 6 illustrates a variable focus lens ultrasonic imaging system in accordance with embodiments of the present disclosure. A piezoelectric transducer, composed of a piezoelectric element, matching layer (ML), and backing material, is installed into a bore in the tool body. The variable-focus lens assembly is installed into the tool body over the bore with bolts or similar fasteners.

The ultrasonic borehole imaging tool 604 is located in the borehole at a borehole depth and at a standoff 603 from the borehole wall 602. A single lens assembly 605 of the ultrasonic imaging tool 604 is installed on the tool body 620. This single lens assembly 605 involves the use of an adjustable-focus acoustic lens 608 with customizable beam focusing to enable high resolution ultrasonic borehole imaging in a range of borehole sizes.

The variable-focus lens assembly 605 may be installed into the tool body 620 with bolts 606 or similar fasteners. A transducer 610 is positioned radially interior to the lens 608 in the tool body 620. The lens may be an elastomeric solid having at least one curved face and adapted for high temperatures. The transducer 610 further includes piezoelectric element 614 and backing material 616, as described above. Radially exterior to the piezoelectric element 614 is an acoustic matching layer 609 bonded to element 614. Between the lens 608 of the lens assembly 605 and the acoustic matching layer 609 is a volume of pressure compensation fluid ('PCF') 607. The PCF may be implemented as a variety of fluids, gases, and or flowable solids, or combinations of these. Mass transfer of the fluid 607 effects an internal volume change which alters the curvature of the lens.

The lens 608 is flexible, and the pressure compensation fluid 607 is fed and removed from the body by pressure control system 631 (including, for example, a pump system) via duct 613. In embodiments, the volume between the matching layer and lens is filled with varying amounts of the pressure compensation fluid (e.g., silicon oil) that serves both to change the lens's geometry and transmit the ultrasonic signal from the matching layer to the lens. The change in the lens's geometry may be effected via a pressure differential between the fluid inside the lens assembly ("behind" the lens) and the ambient pressure exterior to the lens ("in front of" the lens), such as, for example, the outside borehole pressure. By adding or removing fluid 607, the pressure of the PC fluid is modified and the curvature of the lens 608 can be adjusted downhole to focus the ultrasonic signal to a small 6 dB beam spot diameter that has the proper near-far-field transition for the standoff 603 from the borehole wall 602. Leads 611 from the transducer 605 run to transformer coils 207 and on to circuitry 630, which operates the transducer 610 as described with respect to FIG. 3. Circuitry 630, which may include one or more processors, also operates pressure control system 631.

Although the solid lens having a curvature controlled by pressure differential is recommended by many advantages such as reliability precision in the challenging conditions of downhole logging, particular applications may allow alternative implementations of curvature variation. In these alternative implementations, the lens assembly may carry out lens curvature modification using other methods of flexible membrane deformation such as periphery actuation or dielectric elastomeric deformation actuated by an electrical signal; or alternative methods, such as, for example, the use of electrowetting techniques to alter the position of two immiscible liquids of different refractive indices.

FIG. 7 illustrates three focus options that produce a small beam spot diameter at the required standoff 701, 702, 703 of the borehole wall. By decreasing the PC fluid pressure below the borehole pressure, the center of the lens will be deflected towards the transducer. The larger the pressure difference, the larger the curvature of the lens. Thus, the focus of the sensor can be closely controlled by varying the PC fluid pressure relative to the borehole pressure.

Caliper measurements or optical or other feedback mechanisms may be used to provide information used to adjust the transducer's focus in real-time in order to ensure the sound field will generate the best possible image. Thus, the variable-focus lens enables high-resolution imaging of multiple borehole sizes in a single run and correction for washout and other phenomena that alter the borehole size. The caliper measurement may be provided by a separate unfocused, low-resolution transducer, or by electromagnetic, optical, mechanical or other appropriate sensors as known in the art. A control system may be incorporated into the tool that provides the required PC fluid/borehole pressure differential to achieve the optimal focus for the standoff using pre-populated calibration information. Other environmental parameters, such as, for example, borehole temperature, mud weight, and other variables that affect the beam field could also be measured and used to modify the focal parameters of the lens.

Figure 8:
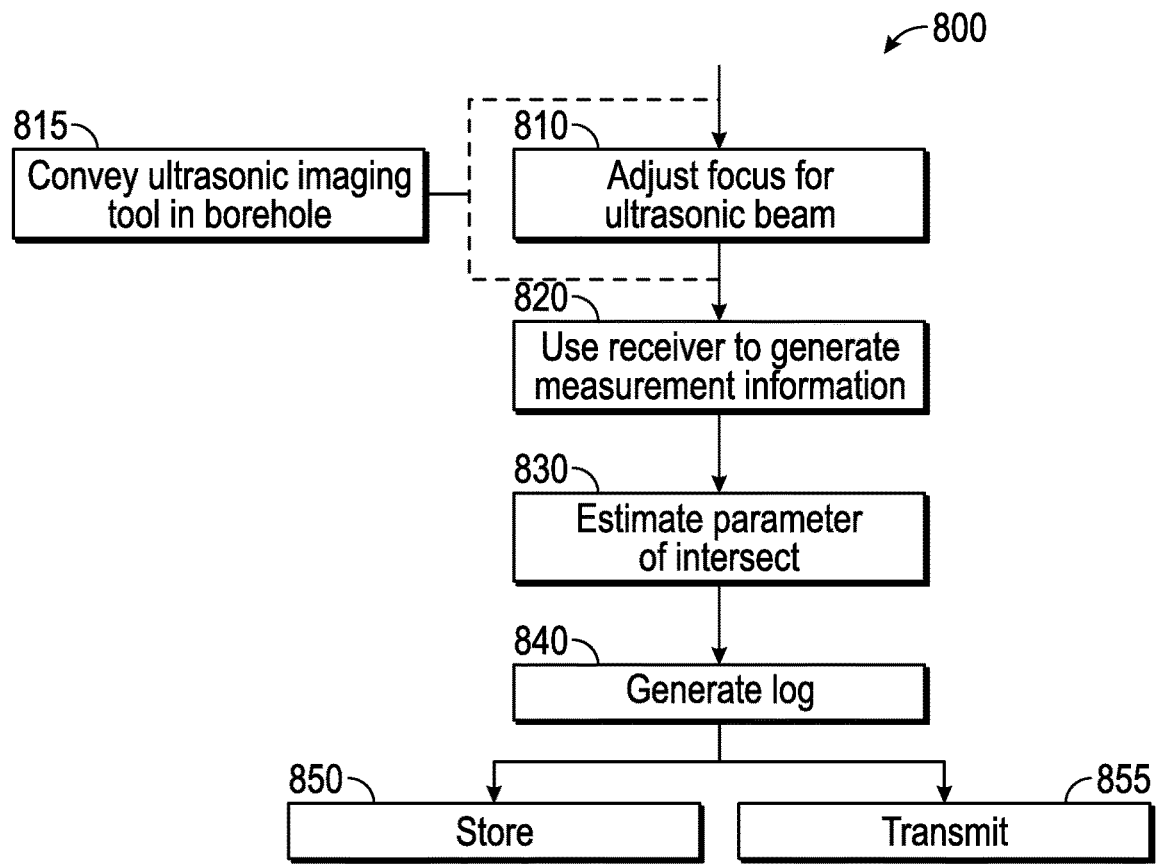
FIG. 8 shows a flow chart illustrating methods for estimating at least one parameter of interest in accordance with embodiments of the present disclosure.

FIG. 8 shows a flow chart 800 illustrating methods for estimating at least one parameter of interest in accordance with embodiments of the present disclosure. Step 810 comprises adjusting a focus for an ultrasonic beam generated from a single-transducer ultrasonic assembly of the ultrasonic imaging tool. The adjusting may be carried out in substantially real-time in dependence upon environmental conditions, the environmental conditions comprising at least one of: i) standoff between the ultrasonic imaging tool and a wall of the borehole; and ii) borehole annulus conditions. Optional step 815 comprises conveying the ultrasonic imaging tool in the borehole, and may be carried out before or after step 810. Step 820 comprises using a receiver to generate measurement information from an ultrasonic signal responsive to the ultrasonic beam. Step 830 comprises estimating a parameter of interest from the information. Step 840 comprises generating a log of the parameter or the signal. Optional step 850 comprises storing the log on a on a non-transitory machine-readable medium. Optional step 855 comprises transmitting the log to another processor. Herein, "information" may include raw data, processed data, analog signals, and digital signals.

Figure 9:
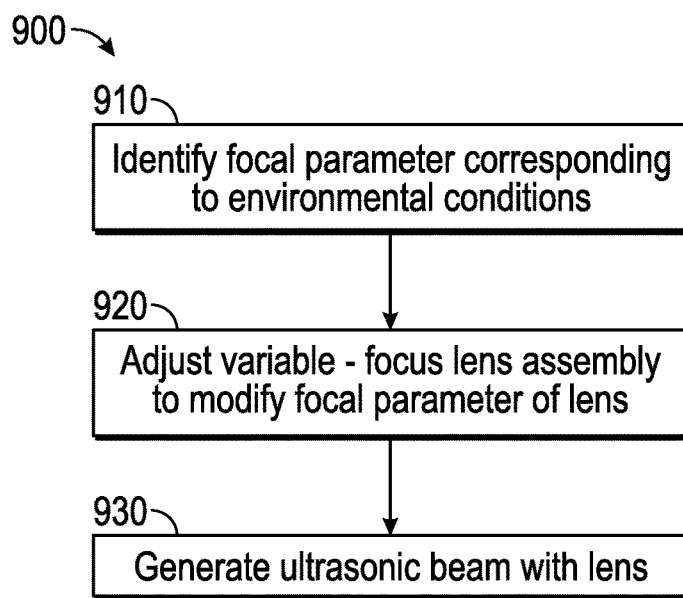
FIG. 9 illustrates a method of adjusting the focus for an ultrasonic beam generated from a single lens assembly of an ultrasonic imaging tool.

FIG. 9 illustrates a method of adjusting the focus for an ultrasonic beam generated from a single lens assembly of an ultrasonic imaging tool. Step 910 may include identifying at least one focal parameter corresponding to the environmental conditions. Step 920 may include adjusting a variable focus lens assembly (comprising a lens) to modify a focal parameter of a lens responsive to the identified at least one focal parameter. The lens assembly may include a lens and a transducer assembly. Modifying the at least one focal parameter may be carried out by altering the curvature of the lens, such as, for example, by changing a pressure of a fluid between the lens and the transducer assembly. Step 930 may include generating the ultrasonic beam using the lens after the adjusting. Some embodiments may use a pulse-echo mode of measurement, in which receiver circuitry operationally coupled to the same transducer may be used to detect the resulting ultrasonic signal.

Figure 10:
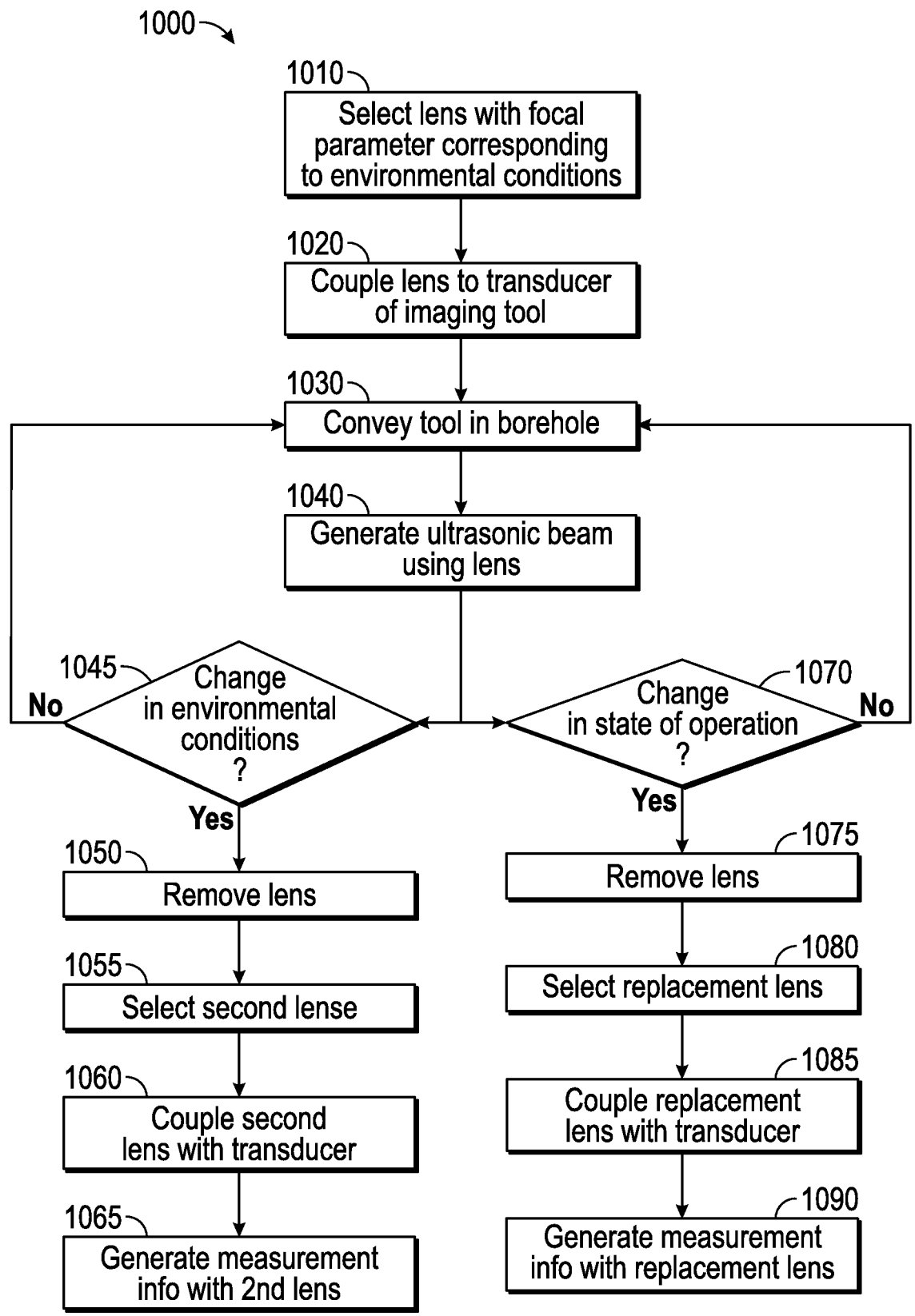
FIG. 10 illustrates an alternative method of adjusting the focus for an ultrasonic beam generated from a single lens assembly of an ultrasonic imaging tool.

FIG. 10 illustrates an alternative method of adjusting the focus for an ultrasonic beam generated from a single lens assembly of an ultrasonic imaging tool. Step 1010 comprises selecting a lens having at least one focal parameter corresponding to the environmental conditions from a set of interchangeable ultrasonic lenses, wherein each lens of the set has focal parameters unique within the set corresponding to particular environmental conditions. The ultrasonic beam may be focused with a focal zone at the borehole wall configured to produce a beam spot of a selected diameter. Step 1020 comprises coupling the lens with a transducer of the ultrasonic imaging tool. In step 1030, the adjustable focus ultrasonic borehole imaging tool is conveyed in a borehole using a carrier. Step 1040 comprises generating the ultrasonic beam using the lens.

Optional steps 1045-65 comprise, upon a change in environmental conditions (1045), removing the lens (1050); selecting a second lens from the set (1055); coupling the second lens with the transducer (1060); and generating the measurement information with the second lens (1065).

Optional steps 1070-90 comprise, upon a change in a state of operation of the lens (1070), removing the lens (1075); selecting a replacement lens (1080); coupling the replacement lens with the transducer (1085); and generating the measurement information with the replacement lens (1090).

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Estimated parameters of interest may be stored (recorded) as information or visually depicted on a display. The parameters of interest (or other formation measurement information) may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

Method embodiments may include conducting further operations in the earth formation in dependence upon the formation resistivity information, the logs, estimated parameters, or upon models created using ones of these. Further operations may include at least one of: i) extending the borehole; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) evaluating the formation; and x) producing one or more hydrocarbons from the formation.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Figure 11:
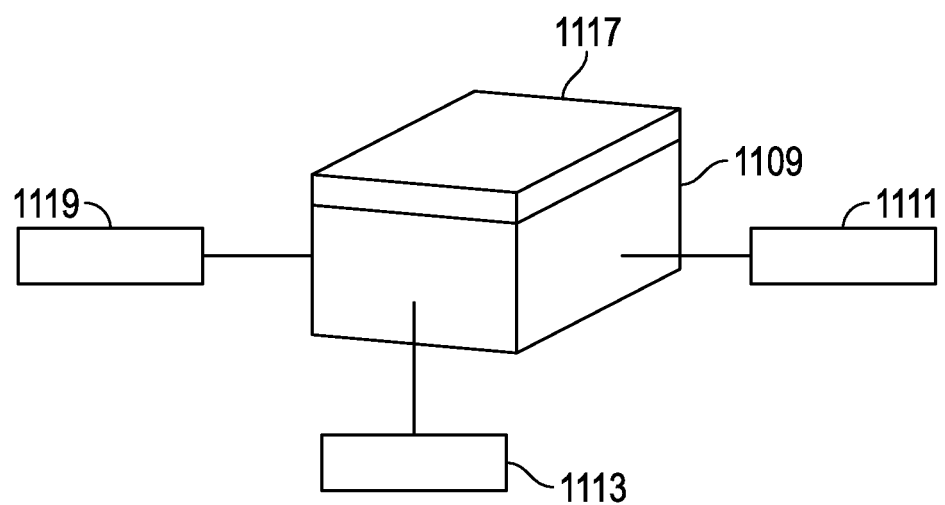
FIG. 11 illustrates an example hardware environment in accordance with embodiments of the present disclosure.

FIG. 11 illustrates an example hardware environment in accordance with embodiments of the present disclosure. In some embodiments, electronics associated with sensors, including the ultrasonic borehole imaging tool may be configured to record and/or process the information obtained. Certain embodiments of the present disclosure may be implemented with a hardware environment 1121 that includes an information processor 1117, an information storage medium 1113, an input device 1111, processor memory 1109, and may include peripheral information storage medium 1119. The hardware environment may be in the well, at the rig, or at a remote location. Moreover, the several components of the hardware environment may be distributed among those locations. The input device 1111 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 1113 stores a program that when executed causes information processor 1117 to execute the disclosed method. Information storage medium 1113 may also store the formation information provided by the user, or the formation information may be stored in a peripheral information storage medium 1119, which may be any standard computer information storage device, such as a USB drive, memory stick, hard disk, removable RAM, or other commonly used memory storage system known to one of ordinary skill in the art including Internet based storage. Information processor 1117 may be any form of computer or mathematical processing hardware, including Internet based hardware. When the program is loaded from information storage medium 1113 into processor memory 1109 (e.g. computer RAM), the program, when executed, causes information processor 1117 to retrieve detector information from either information storage medium 1113 or peripheral information storage medium 1119 and process the information to estimate a parameter of interest. Information processor 1117 may be located on the surface or downhole.

As used herein, a processor is any information processing device that transmits, receives, manipulates, converts, calculates, modulates, transposes, carries, stores, or otherwise utilizes information. The term "information" as used herein includes any form of information (analog, digital, EM, printed, etc.).

In several non-limiting aspects of the disclosure, an information processing device includes a computer that executes programmed instructions for performing various methods. An information processing device may include a microprocessor, resident memory, and peripherals for executing programmed instructions. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device.

As used herein, the term "single-transducer ultrasonic assembly" refers to a device making use of a single transducer (a single transducer device) to produce a focused ultrasonic beam, and which is distinct from a transducer array, which may rely on constructive interference from multiple waves initiated by a plurality of transducers (e.g., a phased array). The single-transducer ultrasonic assembly comprises a transducer, a lens, and coupling between acoustical layers, and is configured to provide a focused ultrasonic beam output using a single transducer. It should be noted that more than one single-transducer ultrasonic assembly may be found on a particular imaging tool. The terms configure, configuration, adjustable, adjustment, modification, modify, and the like, when used in relation to the lens, refer to physical changes in the lens properties affecting the sound physics of beam transmission, as distinct from signal processing.

As used herein, the term "adjustable focus lens assembly" comprises a lens assembly configurable to provide various focal parameters of a produced ultrasonic beam, including variable focus lens assembly and interchangeable lens assembly types. As used herein, the term "variable focus lens assembly" comprises an adjustable focus lens assembly wherein the same lens is used for multiple focal configurations, by adjusting one or more lens dimensions, and/or positioning, and/or orientation without removal of the lens from the tool.

As used herein, the term "environmental conditions" refers to a state representing a set of physical conditions of the environment (environmental parameters) in which the imaging tool is disposed, and includes, for example, standoff between the ultrasonic imaging tool and a wall of the borehole; and borehole annulus conditions, such as temperature; pressure; mudweight, viscosity, acoustic impedance, or sound speed of fluid in the borehole; size, density, and distribution of cuttings, and so on. Information provided by one or more sensors may be used to estimate one or more environmental parameters comprising environmental conditions.

The term "substantially real-time" as applied to estimation of parameters described herein refers to estimation of the parameter of interest while the tool is still downhole and prior to axial movement of the tool in a borehole a distance of 1 meter, 0.5 meters, 0.25 meters, 0.1 meters, or less; and may be defined as estimation of the parameter of interest within 15 minutes of generation of measurement information, within 10 minutes of generation of measurement information, within 5 minutes of generation of measurement information, within 3 minutes of generation of measurement information, within 2 minutes of generation of measurement information, within 1 minute of generation of measurement information, or less.

The term "ultrasonic" as used herein means relating to the use of acoustic waves over 20 kHz for imaging. The term "focal parameter" as used herein refers to parameters affecting or resulting from the focus of an acoustic beam, such as, for example, radius of curvature of an acoustic lens, beam spot dimensions, and the like. Transmitter as used herein refers to circuitry configured to generate signals actuating a transducer to produce an ultrasonic beam. "Unfocused" as used herein relates to an having near field (Fresenel zone) and far field (Fraunhofer zone) regions, in contrast with a focused ultrasonic beam having a focal zone at a focal depth. Receiver as used herein refers to circuitry configured to generate measurement information from signals representing detected acoustic waves resulting from an ultrasonic beam.

While the foregoing disclosure is directed to the one mode embodiments of the disclosure, various modifications will be apparent to those skilled in the art. It is intended that all variations be embraced by the foregoing disclosure.

What is claimed is:

1. A method of ultrasonic borehole logging using an ultrasonic borehole imaging tool in a borehole intersecting the earth formation, the method comprising:
   adjusting a focus for an ultrasonic beam generated from a single-transducer ultrasonic assembly of the ultrasonic borehole imaging tool, comprising selecting a lens in dependence upon a size of the borehole and coupling the lens with a transducer of the single-transducer ultrasonic assembly;
   using a receiver to generate measurement information responsive to an ultrasonic signal caused by the ultrasonic beam; and
   generating a borehole image from the measurement information.

2. The method of claim 1, wherein adjusting the focus comprises:
   selecting the lens having at least one focal parameter corresponding to the size of the borehole from a set of interchangeable ultrasonic lenses, wherein each lens of the set has focal parameters unique within the set corresponding to the size of the borehole;
   coupling the lens with the transducer of the ultrasonic borehole imaging tool; and
   generating the ultrasonic beam using the lens.

3. The method of claim 2, further comprising, upon a change in the size of the borehole to a second borehole size, performing:
- removing the lens from the transducer;
- selecting a second lens having at least one second focal parameter corresponding to the second borehole size from the set of interchangeable ultrasonic lenses;
- coupling the second lens with the transducer of the ultrasonic borehole imaging tool;
- generating a second ultrasonic beam using the second lens; and
- generating the measurement information with the second lens.

4. The method of claim 3, wherein the transducer of the ultrasonic borehole imaging tool comprises a transducer cup and wherein coupling the lens with the transducer of the ultrasonic borehole imaging tool comprises inserting the lens within the transducer cup; and removing the lens from the transducer comprises removing the transducer cup from a tool body of the ultrasonic borehole imaging tool and removing the lens from the transducer cup.

5. The method of claim 2, further comprising, upon a change in a state of operation of the lens:
- removing the lens;
- selecting a replacement lens;
- coupling the replacement lens with the transducer; and
- generating the measurement information with the replacement lens.

6. The method of claim 1, wherein the ultrasonic beam is focused with a focal zone at a borehole wall configured to produce a beam spot of a selected diameter.

7. The method of claim 1, further comprising adjusting the focus in dependence upon environmental conditions, the environmental conditions comprising at least one of: i) standoff between the ultrasonic borehole imaging tool and a wall of the borehole; and ii) borehole annulus conditions.

8. The method of claim 1, wherein the selected lens is configured to work with the transducer on the ultrasonic borehole imaging tool to locate a 6 dB focal zone of the single-transducer ultrasonic assembly proximate a wall of the borehole at a standoff distance associated with the size of the borehole and the ultrasonic borehole imaging tool.

9. An apparatus for ultrasonic borehole logging in a borehole intersecting the earth formation, the apparatus comprising:
- an ultrasonic borehole imaging tool comprising:
  - a single-transducer ultrasonic assembly configured for adjusting a focus for an ultrasonic beam generated from the single-transducer ultrasonic assembly by coupling of a lens corresponding with a size of the borehole with a transducer of the single-transducer ultrasonic assembly;
  - a receiver configured to generate measurement information responsive to an ultrasonic signal caused by the ultrasonic beam; and
  - at least one processor configured to generate a borehole image from the measurement information.

* * * * *